United States Patent [19]

Stone

[11] 3,885,439
[45] May 27, 1975

[54] ROTATING SAMPLING VALVE

[75] Inventor: James Edward Stone, Ringwood, N.J.

[73] Assignee: Hoffmann-La Roche Inc., Nutley, N.J.

[22] Filed: Oct. 24, 1973

[21] Appl. No.: 409,341

[52] U.S. Cl. ............................ 73/422 GC; 137/237
[51] Int. Cl. ............................................. G01n 1/20
[58] Field of Search ................ 73/422 GC; 137/237

[56] References Cited
UNITED STATES PATENTS

| | | | |
|---|---|---|---|
| 2,757,541 | 8/1956 | Watson | 73/422 GC |
| 3,119,251 | 1/1964 | Bowers | 73/422 GC |
| 3,489,011 | 1/1970 | Firman | 73/422 GC |

*Primary Examiner*—S. Clement Swisher
*Attorney, Agent, or Firm*—Samuel L. Welt; Jon S. Saxe; George M. Gould

[57] ABSTRACT

A rotating sampling valve is described consisting of a rotating plate held between two fixed plates. The rotating plate contains a plurality of channels bored through its longitudinal axis which channels are disposed symmetrically around its center axis. Both the upper and lower fixed plates contain the same number of correspondingly placed channels. Thus, when the center plate is rotated liquid flowing through the channels in the center plate are entrapped and transferred to a position indexing with different channels in the upper and lower plates. This sampling valve is useful in obtaining discontinuous samples from column eluents for analytical assay such as, for example, fluorescence analysis of proteins, peptides and amino acids, or in other chemical analysis, process control and other purposes.

5 Claims, 1 Drawing Figure 3,885,439
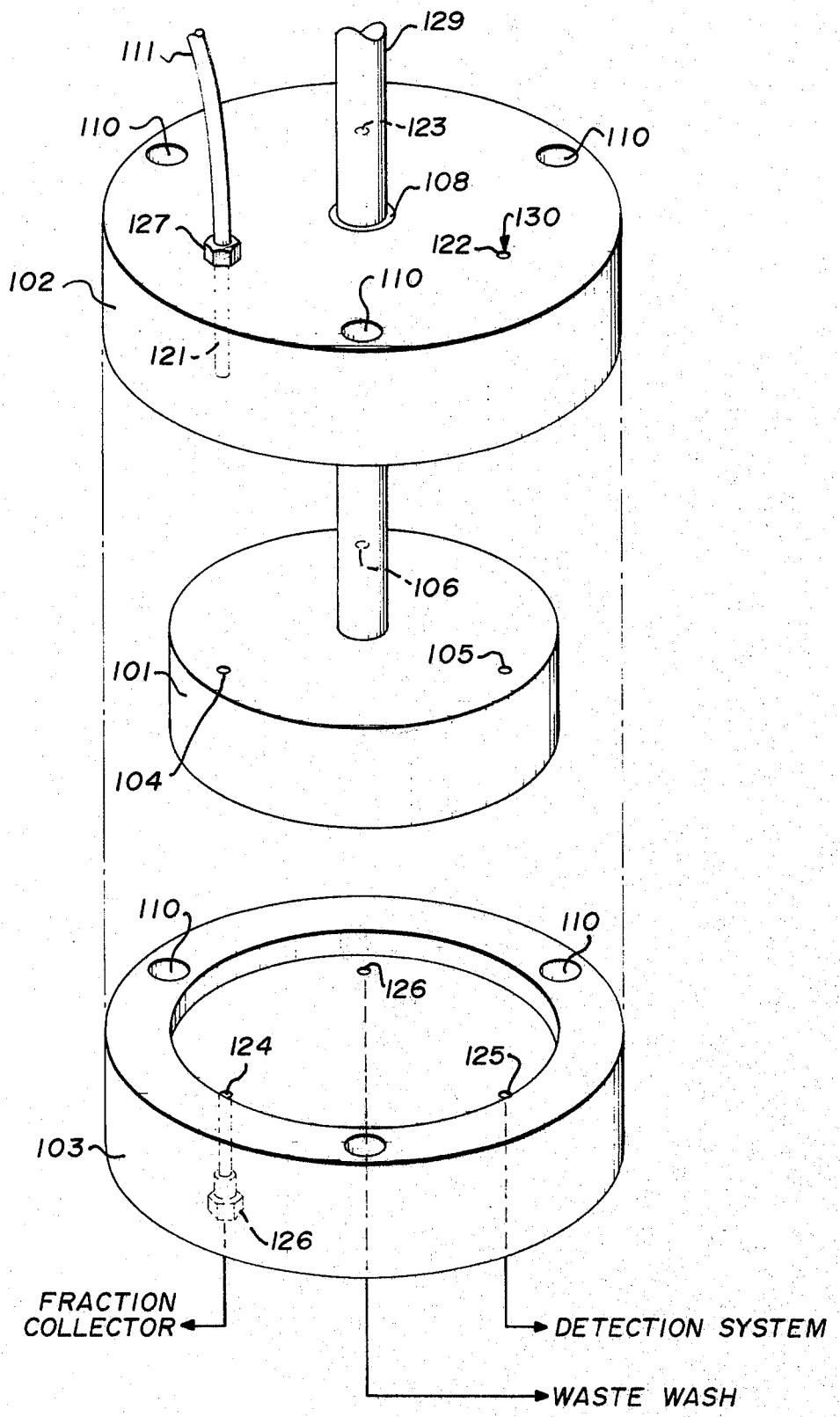

ROTATING SAMPLING VALVE

DESCRIPTION OF THE INVENTION

The present invention relates to a rotating sampling valve useful for obtaining discontinuous samples from liquid streams for analysis. This valve comprises a central cylindrical plate rotating in stepwise fashion by means of a stepping motor, Geneva mechanism or electrically or pneumatically activated solenoid connected thereto by means of a suitable shaft. The central cylindrical plate is clamped between two fixed plates so as to effect a liquid-tight seal between the various plates. The central plate contains a plurality of channels bored through its longitudinal axis, which channels are symmetrically disposed about its central axis. Corresponding channels are contained in the upper and lower fixed plates to serve as liquid inlets and outlets. By stepwise rotation of the cylindrical central plates, the liquid streams flowing through channels contained therein are entrapped and transferred to positions indexing with other inlet and outlet channels of the upper and lower plates. In this manner discrete samples of liquid streams having a volume approximately that of the channels in the central plates can be collected and transferred to a second stream. Such samples would then be available for other operations the operator wishes to perform on the liquid sample.

The rotary valve of the present invention may be more clearly understood by reference to the drawing which shows a side view of a representative valve. As indicated above, the valve consists of rotating cylindrical plate 101 rotatably mounted and clamped tightly between an upper fixed plate 102 and a lower fixed plate 103. The plates may be constructed out of conventional materials such as polyfluorinated ethylene plastic, e.g., Teflon or stainless steel, for example. Most preferably, the rotating plate is made of one of the aforesaid types of materials and the fixed plates are made of the other types.

Cylindrical plate 101 contains a plurality of channels numbering generally from about three to sixty bored parallel to its longitudinal axis and disposed symmetrically about its center axis. Both the upper and lower fixed plates each will contain the same number of channels as the center plate, each channel being correspondingly placed so as to provide a continuous liquid flow path through the commonly positioned channels in all three plates.

The surfaces between the upper and lower fixed plates and cylindrical plate 101 are machined to a smooth, low friction finish so as to minimize friction and facilitate rotation of cylindrical plate 101. Moreover, when the three plates are clamped tightly together these surfaces provide a liquid-tight seal to prevent leakage of liquid between the channels and the plates. Thus, in operating condition plate 101 is clamped tightly between fixed plates 102 and 103 using suitable clamping means provided through holes 110. To facilitate clamping the diameter of the fixed plates 102 and 103 should be somewhat greater than the diameter of the rotating cylindrical plate 101. Clamping of the plates does not prevent the rotation of cylindrical plate 101.

Rotation of cylindrical plate 101 is accomplished using conventional stepping motor means (not shown) which is connected to said plate through shaft 129. Suitable conventional stepping motor means include stepping motor, pneumatically or electrically activated solenoid-cams systems, Geneva mechanisms, and the like. This shaft passes through plate 102 by means of a suitable central hole 108. The stepping motor means is of conventional design and construction and turns the shaft one position or step when activated by an electrical signal.

In the specific embodiment shown in the drawing, cylindrical plate 101 contains three channels 104, 105 and 106 which channels are disposed at an angle of 120° from each other. Both the upper and lower fixed plates each contain three corresponding placed channels at positions 121, 122, 123, 124, 125 and 126. These channels are arranged in such a position as to index with channels 104, 105 or 106 when cylindrical plate 101 rotates around its longitudinal axis so as to provide a continuous liquid flow path through all the channels in the three plates.

Thus, in the specific embodiment described in the drawing, the stepping motor provided will have a step of 120°. It is obvious that if the number of channels is changed such as, for example, 6 or even 60 then the step of the stepping motor will be adjusted accordingly, such as 60° or 6°, respectively. Operation of the valve of the present invention involves a first liquid stream which passes through channel 104, entering through inlet 111 and channel 121 via plastic connector 127 in upper plate 102 and exiting through outlet channel 124 via plastic connector 128 to whatever end use or collection device, i.e., fraction collector, desired by the operator. It is to be noted that inlet channel 121 and outlet channel 124 are in direct flow relationship with channel 104 in this position of the operating cycle.

When the stepping motor is activated by a suitable signal provided from an external source, such as an automatic fraction collector for example, the stepping motor indexes one step. In the embodiment shown such step would be a total of 120°. This indexing causes a similar rotation of cylindrical plate 101. Thus, channel 104, when said rotation is complete, is placed in direct flow relationship with channel 122 of top plate 102 and channel 125 at bottom plate 103. The rotation from the first discussed position causes the entrapment and the transfer of a sample of the liquid stream approximately equal in volume to that of channel 104.

In the second position in the cycle, a second liquid stream enters into inlet means 130 and washes out the entrapped sample in channel 104 through outlet channel 125 for uses appropriate with the system in which the said valve is employed, i.e., a fluorescence detection system when the valve is used in a protein or peptide analyzer.

Upon the next index signal to the stepping motor, cylindrical plate 101 rotates another 120°. At this point in the cycle, channel 104 is in direct flow relationship with channel 123 in top plate 102 and outlet channel 126 in bottom plate 103. A third liquid stream such as, for example, a wash solution passes through channel 104 in this position to ensure that the channel is free from any residual contamination from the first and second liquid streams from the prior cycles when channel 104 returns to its initial position. The wash liquid exits from the valve through outlet channel 126. On the next indexing signal, the stepping motor is again activated and another rotation of 120° is made by cylindrical plate 101 so as to return channel 104 to its original position in the cycle, that is, in direct flow relation with channels 121 and 124. It is understood, of course, that channels 105 and 106 will follow the same cycle as channel 104 except that they are 240° and 120° out of phase, respectively with channel 104. Thus, when channel 104 is in position to pass the first liquid stream, then channel 106 is passing the wash solution and channel 105 is passing the second liquid stream.

While only connectors 127 and 128 are shown in the FIGURE, it is understood that similar connectors can be used in each of the channels in the upper and lower plates therein. Moreover, while the various liquid streams are shown to flow from top to bottom, such flow direction is not critical. Thus, the inlets can be provided at the bottom of the valve and the outlets at the top without imparting from the spirit of the present invention.

The rotating sampling valve of the present invention is of particular usefulness in providing discontinuous sampling for a protein monitor described in U.S. Pat. application Ser. No. 4025 entitled "Protein Monitor," inventor Peter Bohlen, filed of even data herewith.

When used in conjunction with the aforesaid protein monitor, the rotating sample valve of the present invention can be adapted with a plurality of channels in excess of the three shown in the present preferred embodiment. Preferably, such plurality will comprise a multiple of three. Each triad of contiguous channels in the valve could thus be adapted to receive through appropriate inlets in the upper plate channels of a sample liquid stream, a buffer solution for carrying the sample to the detector and a water wash stream, respectively. In this manner, it would be possible to monitor several sample streams simultaneously.

I claim:

1. A rotating sample valve comprising:
    a. a cylindrical plate containing a plurality of channels parallel to its longitudinal axis, said channels being symmetrically disposed about the center axis of said cylindrical plates;
    b. an upper and lower fixed plate between which said cylindrical plate is rotatably mounted, said upper plate and lower plate each containing the same plurality of channels symmetrically disposed around their respective center axis so that such channels are in operative flow relation with corresponding channels in said cylindrical plate;
    c. a stepping motor means which is operatively connected to said cylindrical plate, which stepping motor means has a step proportional to the number of channels in each said cylindrical, upper and lower plates;
    wherein one of said channels in said upper plate is operatively connected with inlet means for a first liquid stream and the corresponding channel in the lower plate is operatively connected to outlet means,
    wherein another of said channels in said upper plate is operatively connected with inlet means for a second liquid stream and the corresponding channel in the lower plate is operatively connected with a second outlet means; and
    wherein another of said channels in said upper plate is operatively connected with inlet means for a third liquid stream and the corresponding channel of said lower plate is operatively connected with a third outlet means, whereby a signal to said stepping motor means causes rotation of said cylindrical plate relative to said upper and lower plates with concomitant entrapment of any liquid stream contained in said channels in said cylindrical plate and transport of said entrapped stream to the next position of said cylindrical plate with respect to said fixed plates.

2. The valve of claim 1 wherein said stepping motor means is a stepping motor.

3. The valve of claim 2 wherein said stepping motor steps 120° and there are three channels in each of said cylindrical, upper and lower plates.

4. The valve of claim 1 wherein the fixed plates are clamped together and the surface between the first plates and the cylindrical plate are machined to a low friction finish so that a liquid-tight seal is obtained between the aforesaid channels and plates.

5. The valve of claim 1 wherein said plurality of channels in each of said cylindrical, upper and lower plates consists of a number which is a multiple of three wherein in each contiguous triad of channels in said fixed upper plate there is a sample liquid stream inlet means, a buffer solution inlet means and a water wash stream inlet means, respectively.

* * * * *